United States Patent [19]

Chu

[11] 3,734,876

[45] May 22, 1973

[54] CROSS-LINKED POLYALKYLENE OXIDE

[75] Inventor: Nan S. Chu, Hartsdale, N.Y.

[73] Assignee: Union Carbide Corporation, New York, N.Y.

[22] Filed: July 6, 1971

[21] Appl. No.: 160,134

[52] U.S. Cl. ............260/33.6 R, 260/2 A, 260/2 BP
[51] Int. Cl. .............................................C08g 51/28
[58] Field of Search .....................260/33.6 R, 2 A, 260/2 BP

[56] References Cited

UNITED STATES PATENTS 3,345,347 10/1967 Elfers et al.....................260/2 A X
3,417,064 12/1968 Bailey............................260/79.5 A Primary Examiner—Lewis T. Jacobs
Attorney—Paul A. Rose, Aldo John Cozzi and Clement J. Vicari

[57] ABSTRACT

A process for chemically cross-linking poly(alkylene oxide) of molecular weight of at least 100,000 which comprises contacting said poly(alkylene oxide) with a suitable cross-linking agent in the presence of a solvent and a free radical catalyst, at a temperature and for a time sufficient to cross-link said poly(alkylene oxide), said poly(alkylene oxide) being present in said solvent in an amount within the range of from about 1 percent to about 10 percent by weight based on the weight of the solvent.

11 Claims, No Drawings

CROSS-LINKED POLYALKYLENE OXIDE

This invention relates to chemically cross-linked poly(alkylene oxide). In a particular aspect, this invention is concerned with a process for chemically cross-linking poly(alkylene oxide) with a cross-linking agent in the presence of a solvent and a free radical catalyst.

It is known that poly(alkylene oxide) such as poly(ethylene oxide) can be cross-linked readily through irradiation with gamma rays. Poly(ethylene oxide) has been shown to form a cross-linked polymer of varying properties through irradiation with gamma rays such as those emitted by a cobalt 60 source. The properties of these irradiated poly(ethylene oxides) are highly dependent on the irradiation dose, that is, the irradiated poly(ethylene oxide) may range in properties from a soluble polymer, to a highly cross-linked horny solid, insoluble in any solvent. Unfortunately, gamma radiation involves the use of a potentially dangerous source with costly protective measures involved in its use, and therefore, this route is not the most desirable process for cross-linking poly(ethylene oxides).

In order to eliminate some of the disadvantages of obtaining cross-linked poly(alkylene oxide), via irradiation, it has been proposed to chemically cross-link poly(alkylene oxide) utilizing a di-vinyl monomer in the presence of a free radical catalyst (Canadian Pat. No. 756,190).

Unfortunately, however, this known chemical technique is not entirely satisfactory from a practical commercial standpoint, because the highest degree of cross-linking is obtained by employment of poly(alkylene oxide) in molten form. The utilization of poly(alkylene oxides) in molten form make them difficult to process. Because of the small amount of both peroxide and cross-linking agent required in the above process, there is also taught therein the utilization of very high concentrations of poly(alkylene oxide)s in solution presumably because it is very difficult to mix uniformly the peroxide (free radical initiator) and the cross-linking agents in the poly(alkylene oxide) polymer. This is particularly true when higher molecular weight poly(ethylene oxide), i.e., (molecular weight $>3 \times 10^5$) is employed. Molten polymer or concentrated solutions of the polymer are extremely viscous so that they cannot be stirred by a conventional stirrer. Moreover, any solvents employed, are not utilized in the cross-linking reaction, but are removed prior to cross-linking. After the cross-linking reaction, due to the stiff, non-flowing, three dimensional net-work of the polymer, further processing the cross-linked product to film form becomes an even more difficult problem. Therefore, although the polymer can be cross-linked as the above Canadian patent indicates unfortunately, the method can hardly be used for large scale production of a commercial product.

It has now been found that poly(alkylene oxide) can be successfully and readily cross-linked by a chemical process. This chemical process involves a rather simple chemical reaction and does not require a source of gamma radiation.

Moreover, by employment of a select class of cross-linking agents and utilization of a select class of solvents during the cross-linking reaction, it has been found that poly(alkylene oxide) can be employed in the form of a dilute solution without the necessity of resorting to the prior art technique of melting the poly(alkylene oxide) prior to reaction in order to obtain highly cross-linked products. The process of the present invention generally comprises chemically cross-linking poly(alkylene oxide) with small amounts of a cross-linking agent as hereafter described, in the presence of an inert solvent and a free radical catalyst. The degree of cross-linking can be varied over a very broad range by selecting appropriate reaction conditions. It is believed that the chemically cross-linked polymers of this invention may be more economically attractive than the radiation induced cross-linked polymers or the previously known chemical techniques, since the cross-linking can be effected in the same reactor utilized for preparation of the poly(alkylene oxide). The cross-linked poly(alkylene oxides) of this invention are of particular interest in agricultural applications or in liquid absorption articles such as baby diapers.

Accordingly, an object of the present invention is to provide a novel chemical process for cross-linking poly(alkylene oxide), utilizing a select class of cross-linking agents, the cross-linking being effected in the presence of an inert solvent and a free radical catalyst. Another object is to provide a novel process for chemically cross-linking poly(ethylene oxide) with a cross-linking agent in the presence of a free radical catalyst and a solvent. A further object is to provide a process for chemically cross-linking poly(ethylene oxide) wherein the poly(ethylene oxide) is employed as a dilute solution. These and other objects of this invention will become apparent to those skilled in the art to which this invention pertains from the ensuing description thereof.

Broadly contemplated, there is provided a process for chemically cross-linking poly(alkylene oxide) which comprises contacting said poly(alkylene oxide) having a molecular weight of at least 100,000, with a cross-linking agent represented by the formula:

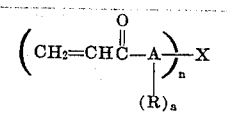

wherein A is nitrogen or oxygen; $n$ has a value of 2 or more, R is hydrogen, an alkyl of 1–6 carbon atoms or aryl of six to 14 carbon atoms; X is $-C_yH_{2y}-$ or $-C_yH_{2y}(OC_yH_{2y})_m-$ in which $y$ is an integer having a value of 2 to 10 and $m$ is an integer having a value of from 1 to about 50; with the proviso that when A is oxygen, $a$ is 0 and when A is nitrogen, $a$ is 1; said contact being made in the presence of an inert solvent and a free radical catalyst, at a temperature and for a time sufficient to cross-link said poly(alkylene oxide), said poly(alkylene oxide) being present in said solvent in an amount within the range of from about 1 to about 10 percent by weight based on the weight of the solvent.

More specifically, the present invention contemplates a process for chemically cross-linking poly(ethylene oxide), having a molecular weight of at least about 100,000 which comprises contacting poly(ethylene oxide) with the above cross-linking agent, preferably poly(ethylene glycol) diacrylate or neopentyl glycol diacrylate in the presence of a free radical catalyst, preferably acetyl peroxide, and a solvent, preferably benzene at temperatures within the range of about 50°C. to about 100°C. for a time sufficient to produce cross-linked poly(ethylene oxide), said poly(ethylene oxide) being present in said solvent in an amount within the range of from about 1 percent to about 10 percent by weight based on the weight of the solvent.

Advantageously, the manner of mixing the reactants is not critical and the mixing may be effected by a variety of conventional techniques. For example, the poly(ethylene oxide) reactant may be first added to the solvent followed by the addition of the cross-linking agent and the free radical catalyst. Alternatively, the reactants may be introduced simultaneously into the reaction vessel containing the solvent.

The poly(alkylene oxides) which can be chemically cross-linked according to this invention include a wide variety of known poly(alkylene oxides). It is believed that any poly(alkylene oxide) with a hydrogen atom on the carbon atoms adjacent to the ether oxygen can be cross-linked as disclosed herein. Among the poly(alkylene oxides) which can be cross-linked according to this invention include homopolymers of ethylene oxide, propylene oxide and butylene oxide, copolymers of ethylene oxide, propylene oxide, butylene oxide and mixtures thereof. In general, poly(alkylene oxides) having an average molecular weight of at least 100,000 to about 5,000,000 or greater, up to 10,000,000, are operable. This invention is particularly adapted to the chemical cross-linking of poly(ethylene oxide) having a molecular weight of at least 100,000, which results in cross-linked products having a high degree of water absorption qualities, but is in no way restricted thereto.

The cross-linking agents which are suitable in the practice of this invention can, as mentioned previously, be represented by the general formula:

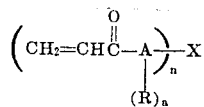

wherein A is nitrogen or oxygen; $n$ has a value of 2 or more; R is hydrogen, an alkyl of 1–6 carbon atoms or aryl of six to 14 carbon atoms; X is $-C_yH_{2y}-$, or $-C_yH_{2y}(OC_yH_{2y})-$ in which $y$ is an integer having a value of 2 to 10, and $m$ is an integer having a value of from 1 to about 50 with the proviso that when A is oxygen, $a$ is 0, and when A is nitrogen, $a$ is 1. Merely as illustrative, compounds containing the above structure include, 1,4-butylene glycol diacrylate, 1,3-butylene glycol diacrylate, tetra ethylene glycol diacrylate, polyethylene glycol diacrylate, methylene bisacrylamide and pentaerythritol triacrylate.

The relative amounts of poly(alkylene oxide) and cross-linking agent employed in the process of this invention can be varied over a wide range. It has been found that the higher the molecular weight of the poly(alkylene oxide), the less cross-linking agent is required to obtain cross-linking, as indicated by the insolubility of the resultant polymer. In general, the amount of cross-linking agent required will represent from about 0.5 to about 12 weight percent of the amount of poly(alkylene oxide) employed and more preferably an amount within the range of from about 1.0 to 9.0 percent. Ideally, if a polymer is completely cross-linked to an infinite network, i.e., only a single molecule exists, then the polymer will be insoluble in water. Different degrees of cross-linking can be measured roughly by the amount of swelling or absorption in a good solvent for the cross-linked polymer. In the present invention, cross-linking is determined by the ability to absorb water without dissolving in the water. The above ranges will give an end product with the best compromise of percent of cross-linked poly(ethylene oxide) content (water insoluble but swellable fraction) and water pickup ability (swellability) required when used in applications such as babies' diapers. However, it should be noted that concentrations outside the above range can also be used when products with either lower cross-linked poly(ethylene oxide) content, but higher swellability or with higher cross-linked poly(ethylene oxide) content but lower swellability are desired.

A number of different free radical catalysts can be used in the process of this invention. Typical free radical catalysts include azobisisobutyronitrile, benzoyl peroxide, acetyl peroxide, 2,4-dichlorobenzoyl peroxide, 2,2-azobis(2-methylpropionitrile) and in general any free radical generating compound which will generate a substantial number of free radicals over a temperature range of interest from about 50°C. to about 100°C. The preferred free radical catalyst for poly(ethylene oxide) is acetyl peroxide. The amount of catalyst may vary from about 0.03 to about 1.5 percent based on the amount of poly(alkylene oxide) more preferably about 0.05–0.7 percent. Again, the acetyl peroxide can also be used in a concentration outside the above cited limit, but the product obtained would have a higher content of uncross-linked poly(ethylene oxide).

An important criterion for the successful practice of the invention is the employment of a solvent for and during the crosslinking reaction. Suitable solvents include, for example, benzene, methanol, methylene dichloride, ethylene dichloride and toluene. By employing a solvent in the practice of the invention, it is possible to cross-link the poly(alkylene oxide) at concentrations of about 1 percent to about 10 percent poly(alkylene oxide) by weight based on the weight of the solvent, preferably about 2 percent to about 8 percent and indeed successful practice of the invention depends upon these concentrations being employed, i.e., 1 percent to about 10 percent poly(alkylene oxide).

The temperature at which the process can be carried out is, of course, related to the particular catalyst used in the reaction. The temperature range for cross-linking poly(alkylene oxide) can be varied from about 50°C. to about 100°C. The preferred temperature is from about 60°C. to about 80°C., particularly when using acetyl peroxide as catalyst.

The following examples will more fully illustrate the process of this invention.

EXAMPLE I

Into a 250 ml. pressure bottle benzene (100 ml.), 5 grams of poly(ethylene oxide) (molecular wt. $6 \times 10^5$), 0.2 grams of polyethylene glycol diacrylate and 1.2 ml. of an acetyl peroxide solution were added after the flask had been thoroughly flushed with nitrogen. The acetyl peroxide solution was made by diluting 5.0 ml. of a 25 percent acetyl peroxide (in dimethyl phthalate) to 50.0 ml. with benzene. The bottle was again flushed with nitrogen and capped. The bottle was then placed in a 73°C. constant temperature bath for 3.5 hours. At the end of the reaction, 2 ml. of a solution, made by dissolving 0.7 grams of 2,6-di-t-butyl phenol in 50 ml. benzene were added. The product was cast into a film on a glass plate at room temperature. The dried film when placed in distilled water imbibed 46 times of its weight of water after 24 hours and 39 times of its weight of water when placed in a 0.3 M. NaCl solution.

The per cent weight of cross-linked poly(ethylene oxide) in the product was determined by soaking a piece of film (0.1–0.5 gram) in 100 ml. of distilled water for 16 hours with occasional shaking. The swelled film was then picked up, drip-dried and then dried in an oven at 50°–60°C. under reduced pressure. The weight of the film was recorded as the insoluble content (or cross-linked poly(ethylene oxide)) of the product. The water which has been used to soak the film was also evaporated to dryness under nitrogen at 50°–60°C. the residue left was recorded as the solubles content of the product. The content of the cross-linked product (i.e., water insoluble) was 86.4 percent and the soluble content 13.6 percent.

EXAMPLE II

The procedure of Example I was repeated except that 1.6 ml. of the acetyl peroxide solution was used. The water intake of the dry film in distilled water and 0.3 M. NaCl solution after 24 hours was 63 and 46 times of their original weight respectively. The insoluble and soluble contents of the polymer were 80.3 and 19.7 percent respectively.

EXAMPLE III

The procedure of Example I was repeated except that the flask was kept in a bath at 92°–94°C. for 20 minutes. When placed in distilled water, the film imbibed 21 times of its weight of water after 2 minutes and 54 times of its weight of water after 24 hours.

EXAMPLE IV

The procedure of Example I was repeated except that 10 grams of a higher molecular weight poly(ethylene oxide) (i.e., molecular wt. 4 × 10⁶) was used. The weight increase after 24 hours in distilled water was 70 times of its original weight.

EXAMPLE V

The procedure of Example I was repeated except that 5 ml. of a 2 percent solution of 2,2'-azobis(2-methylpropionitrile) was used instead of acetyl peroxide and the reaction was carried out at 56°C. for 7 hours. The reaction mixture after casting also gave a water swellable film.

The cross-linked poly(alkylene oxide)s of this invention are of particular interest in agricultural applications and in providing water absorption articles or films. They can be used as plant growth media with soil, sand, peat moss and/or vermiculite. The growth media which comprise the cross-linked poly(alkylene oxide)s and natural growth media, can also include active agents such as fertilizers, herbicides, fungicides and/or insecticides.

The cross-linked poly(alkylene oxide)s of this invention are believed to be structurally a matrix of cross-linked poly(alkylene oxide)s which are substantially insoluble in water, and organic solvents at ambient or elevated temperature; they will swell upon contact with liquids, solutions and/or suspensions into the polymeric matrix of the material; they will retain liquids and solutions incorporated into their matrix and will release the same to an environment which has a lower concentration of such liquids or solutions than that concentration of the liquid or solution within the polymeric matrix; they will incorporate liquids and solutions from the surrounding environment when the concentration of such liquids and solutions in the surrounding environment is greater than the concentration of the same within their polymeric matrix and the liquids and solutions are releasable from the polymeric matrix by evaporation.

Thus, the cross-linked poly(alkylene oxide)s of the present invention are particularly suitable in those applications wherein a high degree of liquid absorbency is desired. Merely, as illustrative the cross-linked poly(alkylene oxide)s of the present invention are particularly suitable as the absorbing media in baby diapers.

What is claimed is:

1. A process for chemically crosslinking poly(alkylene oxide) having a molecular weight of at least 100,000 which comprises contacting said poly(alkylene oxide) with a crosslinking agent represented by the formula:

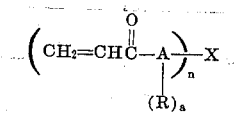

wherein A is nitrogen or oxygen; $n$ has a value of 2 or more, R is hydrogen, an alkyl of 1–6 carbon atoms or aryl of six to 14 carbon atoms; X is $-C_yH_{2y}-$ or $-C_yH_{2y}(OC_yH_{2y})_m-$ in which $y$ is an integer having a value of 2 to 10 and $m$ is an integer having a value of from 1 to about 50 with the proviso that when A is oxygen, $a$ is 0 and when A is nitrogen, $a$ is 1; said contact being made in the presence of an inert solvent and a free radical catalyst, at a temperature and for a time sufficient to crosslink said poly(alkylene oxide), said poly(alkylene oxide) being present in said solvent in an amount within the range of from about 1 percent to about 10 percent by weight based on the weight of the solvent.

2. A process according to claim 1 wherein the cross-linking agent is polyethylene glycol diacrylate.

3. A process according to claim 1 wherein the cross-linking agent is 1,4-butylene glycol diacrylate.

4. A process according to claim 1 wherein said poly(alkylene oxide) is present in said solvent in an amount within the range of about 2 percent to about 8 percent by weight based on the weight of said solvent.

5. A process according to claim 1 wherein the poly(alkylene oxide) is poly(ethylene oxide).

6. A process according to claim 1 wherein the solvent is benzene.

7. A process according to claim 1 wherein the free radical catalyst is acetylperoxide.

8. A process according to claim 1 wherein said poly(alkylene oxide) and cross-linking agent are contacted at temperatures within the range of about 50°C. to about 100°C.

9. A process according to claim 1 wherein said cross-linking agent is employed in an amount of about 0.5 to about 12 weight percent based on the weight of the poly(alkylene oxide).

10. A process for chemically cross-linking poly(ethylene oxide) having a molecular weight of at least 100,000 which comprises contacting said poly(ethylene oxide) with polyethylene glycol diacrylate in the presence of acetyl peroxide and benzene at a temperature within the range of about 50°C. to about 100°C. for a time sufficient to crosslink said poly(ethylene oxide), said poly(ethylene oxide) being present in said benzene in an amount of about 1 percent to about 10 percent by weight based on the weight of said benzene.

11. A process according to claim 10 wherein said poly(ethylene oxide) is present in said benzene in an amount of about 2 percent to about 8 percent by weight based on the weight of said benzene.

* * * * *